July 17, 1951 — E. ZECHER — 2,561,261

COUNTERBALANCED AND COUNTERACTION INTERNAL-COMBUSTION ENGINE

Filed Aug. 31, 1949 — 2 Sheets-Sheet 1

INVENTOR
Ernest Zecher
Henry V. Bock
AGENT

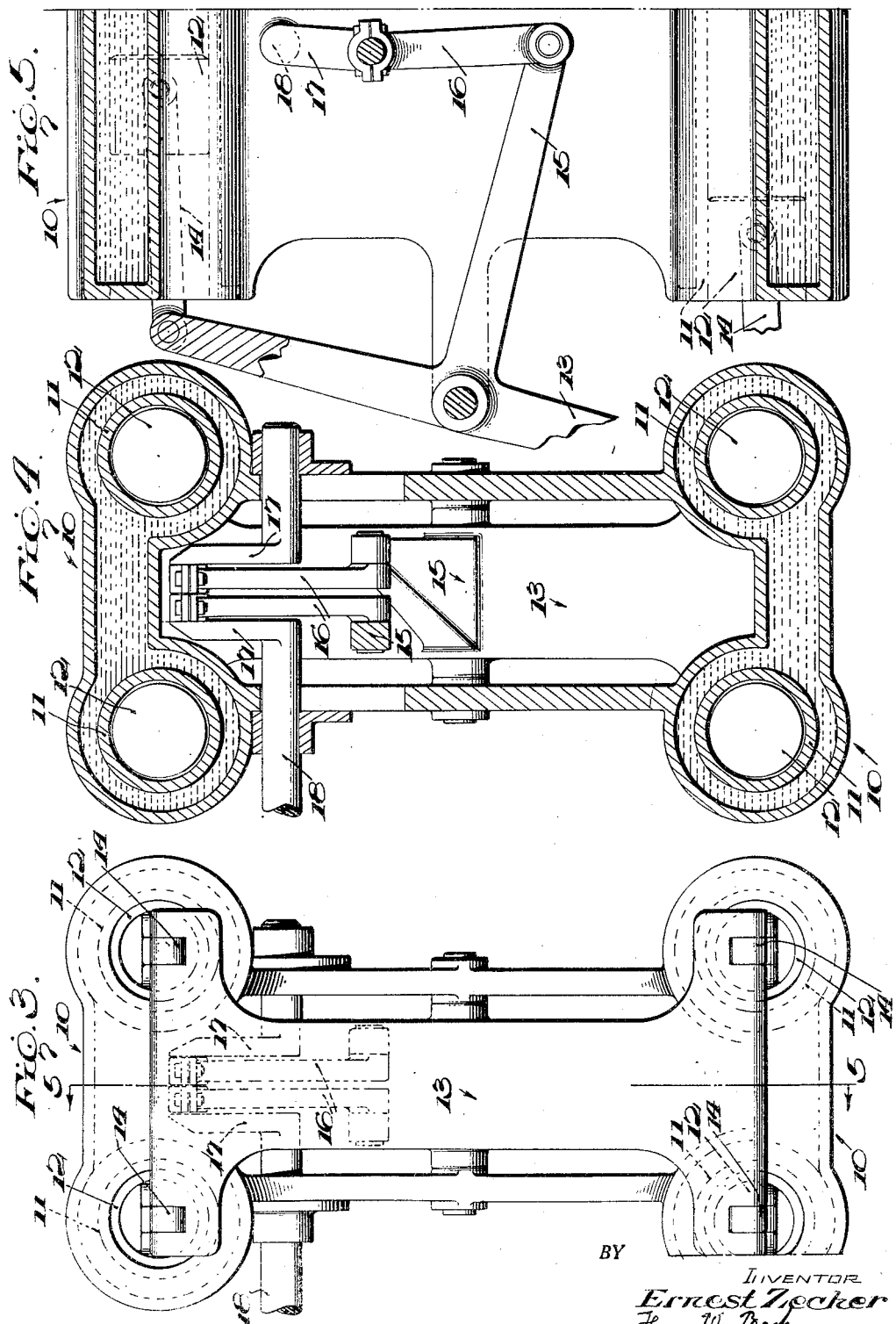

Patented July 17, 1951

2,561,261

UNITED STATES PATENT OFFICE 2,561,261

COUNTERBALANCED AND COUNTERACTION
INTERNAL-COMBUSTION ENGINE

Ernest Zecher, Middletown, Ohio

Application August 31, 1949, Serial No. 113,463

14 Claims. (Cl. 123—51)

My invention relates to internal combustion engines, and it is not a mere general improvement or refinement of existing types of engines, but is the specific basic design of a mechanism devised to convert the variable reciprocating motion of pistons into uniform rotary motion of the crankshaft, and to greatly reduce the excessive friction and vibration commonly accepted as being unavoidable in internal combustion engines, and to greatly reduce the cost of maintenance and the replacement of certain parts directly subjected to this excessive friction and vibration.

It is common basic practice to directly join the reciprocating piston to a connecting rod by means of an oscillating type of wrist-pin bearing, and to join the opposite end of this connecting rod to a crank by means of a revolving type of bearing fitted to the crank-pin in order to provide for the conversion of the variable reciprocating motion into uniform rotary motion of the crankshaft in the most direct manner and with the fewest parts.

It is apparent that at the beginning and the end of every piston stroke when the piston travel is arrested, and the direction of travel is reversed, that the wrist-pin, connecting rod and crank-pin represent a straight line and are on a common plane, whereas, at mid-stroke, the piston attains its greatest speed and the connecting rod has attained its greatest degree of angularity, and imposes a very heavy side-pressure of the piston against the opposite side-wall of the cylinder, and that during every complete revolution of the crankshaft, the direction of the angularity of the connecting rod is reversed, and a similar degree of angularity is attained during the return stroke of the piston, and the side-pressure is likewise reversed and exerted against the other side-wall of the cylinder, and resulting in both piston and cylinder being worn out-of-round, and loss of compressions, gas leakage past the piston rings and excessive fuel and oil consumption result, and costly engine rebuilding must be done in order to restore the original efficiency of the engine.

It is also apparent that in an engine having but one reciprocating piston in relation to each cylinder, that exactly one-half of the potentially available piston area of the cylinder is being utilized for power purposes, and that the energy of the expanding gases exerted against the firmly affixed cylinder-head is lost for power purposes.

In order to correct these defects of design and construction, I present the following objectives:

(First) To provide for a very close approximation of straight-line delivery of the reciprocating motion of the pistons by means of special piston-rods to a triple-arm, triple-action rocker, and providing for the final conversion of the variable piston motion into uniform rotary motion of the crankshaft, and with a minimum of friction and vibration.

(Second) To provide for the counter-balancing of certain cycles of operation against certain other cycles of operation through the medium of triple-arm, triple-action rockers in order to relieve the crankshaft of unnecessary stresses, friction and vibration.

(Third) To utilize for useful power purposes, all of the potentially available piston area of cylindrical combustion chambers by using opposed reciprocating pistons, and to provide a thoroughly practical and effective mechanism for the co-ordination of the moving parts directly involved, and to convert the variable reciprocating motion of the pistons into uniform rotary motion with a minimum of friction and vibration, and with a high net power rating and a relatively low fuel consumption.

(Fourth) In a four cycle, four cylinder engine, or any practical multiple of four cylinders, to provide for the counter-balancing or counter-action of the power cycle against the compression and exhaust cycles of operation, and also to provide for the actuation of the fuel charging or inlet cycle, and to utilize all of the potentially available piston area, and to convert the reciprocating motion of the various pistons into uniform rotary motion with a minimum of parts and a high degree of efficiency.

Fifth) In a two cycle engine comprising two cylinders, or any practical multiple of two cylinders, to provide for the counter-balancing of the power cycle against the compression cycle, and to provide for utilizing all of the potentially available piston area in a practical and effective manner.

The manner in which I attain these objectives is clearly shown in the drawings, and in the descriptions relating to the drawings, and in the references to the basic principles of this new engine.

Fig. 1 is a side elevation of a four cycle, four cylinder engine of which the basic plan consists of a top row of two open ended cylinders 11 arranged horizontally and the cylinders 11 paralleling each other, and directly below at a pre-determined distance, a similar pair of two cylinders 11 arranged horizontally, each cylinder 11 having two opposed pistons 12, the combustion chamber being between the opposed pistons 12, thus forcing them outwardly during the power cycle and thereby utilizing all of the potentially available piston area, the pistons 12, eight in number, each joined to a special type of piston rod 14 having oscillating type of wrist-pin-bearings at both ends of all piston rods 14, the outward ends of each pair of piston rods 14 joined by the previously mentioned wrist-pin-bearing-assemblies to the adjacent end of a 3-arm rocker 13, these rockers 13, 13, two in number in relation to a four cycle, four cylinder engine, are arranged, one rocker 13, a pre-determined distance beyond the left ends of the top and bottom rows of cylinders 11—11, the other rocker 13, similarly arranged at a pre-determined distance beyond the ends of the aforesaid top and bottom rows of cylinders 11—11, and to the right of ends of said cylinders, the rocker shafts and bearings at right angles to the bores of the cylinders 11 of both top and bottom rows, and on a horizontal plane mid-way between the top and bottom cylinder rows, the third-arms 15, 15 (two in number) of the 3-arm rockers 13, 13 joined by oscillating type of wrist-pin-bearing to conventional type of connecting rods 16, 16, the opposite ends of these two connecting rods 16, 16 joined to a crank 17 by revolving type of crank-pin-bearing-assemblies, the two rods 16, 16 joined to a single crank-pin preferably integral with double-arm cranks and crankshaft extensions as shown in other figures of the drawings and correlating with what has been shown in the side elevation of Figure 1, this arrangement of the third arms 15, 15, of the rockers 13, 13, connecting rods 16, 16 and crank 17, crankshaft 18 provide for the final conversion of the variable reciprocating motion of the eight opposed pistons into uniform rotary motion of the crankshaft 18 with only one revolving-type of crank-pin-bearing involved in the process of conversion and providing for two power impulses in relation to one complete revolution of the crankshaft 18, and also providing a power impulse in relation to every oscillation of the rockers 13, 13, rotation of the various cycles of operation render the positive action required, the crankshaft 18 only delivering the net power produced, and the slight duty of maintaining the timed relation of the parts involved.

The diagonal indicating lines are shown leading from the 3-arm rockers to their respective ends of the third arms where juncture is made with the connecting rods, the connecting rods being properly joined to the crankshaft.

Fig. 3 is an end elevation showing a direct view of the ends of four cylinders arranged in two horizontal rows of two cylinders per row, the top row being directly above the bottom row, the crankshaft and crankshaft bearings being shown, and on line 5—5 the crank-pin, crank arms and wrist-pins of the third arms of the 3-arm rockers are shown.

Figure 1:
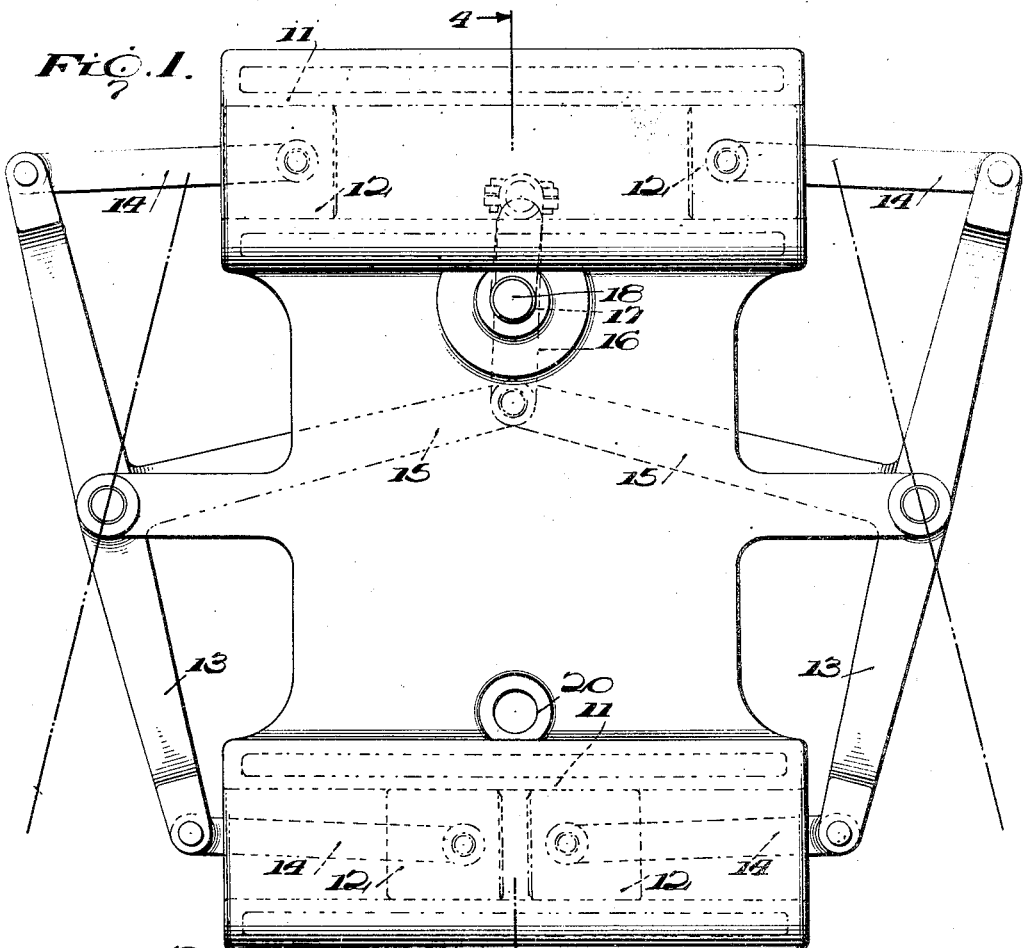
Fig. 1 is an elevation partly in section of the embodiment of my invention.

Fig. 4 is a sectional view on line 4—4 of Fig. 1 and referring to cylinder arrangement, the location of the crank, crankshaft bearings, the third arms of the 3-arm rockers, the rocker bearings and the frame casting.

Fig. 5 is a partial section on line 5—5 of Fig. 3 showing the detailed arrangement of an upper cylinder with its piston at the beginning of a stroke, the third arm of the 3-arm rocker at its lowest working position, and the crank at the beginning of a revolution.

Owing to the fact that the parts of this engine that are involved in this application for patent rights are relatively few in number, the full names applied to the various parts are given in the drawings, and since no changes are required in regard to valves and their actuation, ignition or lubrication, no mention has been made of them in description, or any effort to show them in the drawings.

Inlet and exhaust ports and spark plugs located adjacent to and communicating with the combustion chambers at the clearance space between the opposed pistons when the said pistons are at the beginning of a stroke provides ample reference to these parts, and a fly or balance wheel fitted to the crankshaft will function in the usual manner of providing a more stable motion, and assist in carrying the engine past dead centers.

In the drawings and in the descriptions referring to the drawings, the four cycle, four cylinder engine has been constantly referred to, because only in an engine comprising four cylinders, or any multiple of four cylinders operating on the four-cycle basis, can the various cycles of operation be counter-balanced to the fullest extent, and likewise friction and vibration reduced to the fullest extent and with a high rate of efficiency and economy of operation.

Fig. 1 of the drawings presents a side elevation of the basic requirements for a two cycle, two cylinder engine utilizing all of the potentially available piston area of the cylinders, and provides for counter-balancing the power cycle against the compression cycle, and provides for a close approximation of straight-line delivery of the piston motion through the medium of the 3-arm rockers and thence to the crankshaft, two cylinders yielding two power impulses in relation to one complete revolution of the crankshaft.

In this two cycle engine, any multiple of two cylinders may be added and their cycles co-ordinated, each additional pair of cylinders requiring an additional pair of rockers in an engine having opposed pistons.

In the plans previously outlined for both four and for two cycle engines, the basic plans of using rockers to provide for reduction of friction and vibration and a close approximation of straight-line delivery of the piston motion were based upon the use of opposed pistons, but the same basic plans can be applied to engines having but one piston per cylinder.

Figure 2:
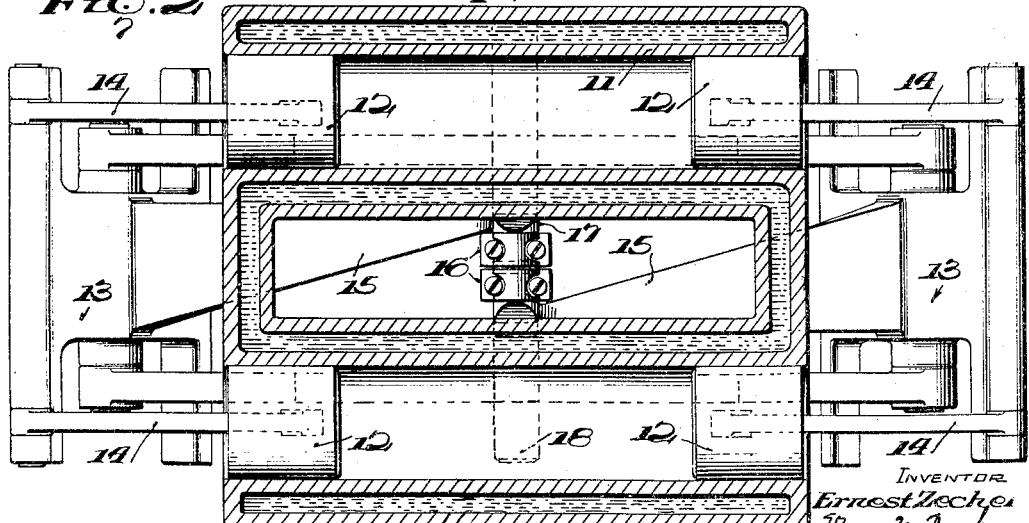
Fig. 2 is a top plan (partly in section) showing both cylinders of the top row and their respective opposed pistons, two pistons being joined by the special type of piston rods to the adjacent upper end of a rocker, the two opposing pistons similarly joined to the upper end of the other rocker.

Fig. 2 is a top plan (partly in section) showing both cylinders 11, 11 of the top row of a horizontal engine 10 and their respective opposed pistons 12, two pistons being joined by the special type of piston rod 14 to the adjacent upper end of a rocker 13, the two opposing pistons 12 similarly joined to the other end of another rocker 13.

The diagonal indicating lines are shown leading from the 3-arm rockers 13 to their respective third arms 15 where juncture is made with the connecting rods 16, the connecting rods being properly joined to the crankshaft. (The crankshaft not shown in Fig. 2.)

Fig. 3 is an end elevation showing a direct view of the basic cylinder 11 arrangement and pistons 12, connecting rod 16, crank 17, and crankshaft 18.

Fig. 4 is a sectional view on line 4—4 of Fig. 1 and referring to cylinder arrangement 11—11—11—11, pistons 12, rocker 13, third arms of the 3-arm rockers 15, 15, and the rocker bearings and frame casting.

Fig. 5 is a vertical section on line 5—5 of Fig. 3 showing the detailed arrangement of an upper cylinder 11 with the piston 12 at the beginning of a stroke, and a lower cylinder 11 with its piston 12 at the end of a stroke and piston rods 14—14 and the position of the rocker 13 and the third arm 15 with the pistons in the position shown, and showing the detailed arrangement of connecting rod 16, crank 17, and crankshaft 18.

Owing to the fact that the number of parts involved in this application are relatively few in number, full names of the various parts involved were written in in addition to the numerals inserted for reference, and since no radical changes are required in regard to valves and their actuation, or to ignition and lubrication, therefore no provision was made in the drawings or in descriptive references to the drawings.

The location of inlet and exhaust ports and ignition terminals (spark plugs) adjacent to and communicating with the combustion chambers at the clearance space between the opposed pistons of each cylinder provides ample reference to these parts, and a fly or balance wheel fitted to the crankshaft in the usual manner will function in a more stable motion and assist in carrying the engine past dead centers especially at very low speeds.

The drawings and the descriptions referring to the drawings have been carried out in reference to a horizontal engine in order to avoid confusion, but the same basic design applies equally well to an engine of vertical design and construction.

In the drawings and in the descriptions referring to the drawings the four cycle, four cylinder engine has been constantly referred to, because only in an engine comprising four cylinders, or any practical multiple of four cylinders operating upon the four cycle basis, can the various cycles of operation be counter-balanced to the fullest extent in order to reduce friction and vibration to the greatest extent, and with a high rate of efficiency and economy of operation.

Fig. 1 of the drawings in addition to referring to the four cycle, four cylinder engine also is a side elevation of the basic design of a two cycle, two cylinder internal combustion engine, providing two power impulses in relation to one complete revolution of the crankshaft, and providing for the counter-balancing of the power cycle against the compression cycle, and providing a very close approximation of straight-line delivery of the reciprocating motion of the pistons, one pair of rockers being required in relation to two cylinders, and any multiple of two cylinders may be added to the first pair and the cycles of operation be co-ordinated in proper sequence.

The reference to Fig. 1 as a side elevation of a two cycle engine is in relation to an engine having opposed pistons utilizing all of the potentially available piston area of its cylindrical combustion chambers.

Having outlined the objectives and shown by the drawings and the description referring to the drawings the manner in which I carried out the objectives in order that anyone skilled in the art of engine building will be enabled to build an engine by strictly adhering to the plans presented.

All internal combustion engines are subjected to severe stresses and vibration due to the explosive action that occurs during every power cycle, and it is with these inherent conditions constantly in mind that I have devised the shown and claimed improvements in internal combustion engines.

What is claimed is:

1. In a four cycle internal combustion engine the combination comprising a frame, a multiple of four cylinders open at their ends and rigid with the frame, an equal multiple of two of said cylinders being arranged with their axes parallel to and coplanar with one another and constituting a row parallel to a like second row, the corresponding ends of the cylinders of one row lying in a common plane and in the plane of the ends of the second row of cylinders, a pair of pistons slidable in each cylinder, piston rods each pivoted to the outer end of a piston, a pair of rockers fulcrumed on the frame and each having three arms rigid with one another and including two right angles and having one arm pivoted to the piston rod of a piston of a row and another arm to a piston of the other row, a plurality of connecting rods each pivoted at one end to the third rocker arm, a shaft journaled in the frame between one row of cylinders and the plane equidistant from both rows of cylinders and having cranks each pivoted to the other ends of a pair of connecting rods each connected by its rocker to pistons of different rods and operable in corresponding portions of cylinders of different rows.

2. The combination according to claim 1 and wherein each piston rod is connected to its piston and rocker arm respectively by a wrist-pin-bearing assembly.

3. In a four cycle internal combustion engine the combination comprising a frame, a multiple of four cylinders each having an open end and a closed end rigid with the frame, an equal multiple of two cylinders being arranged with their axes parallel to and coplanar with one another and constituting a row parallel to a like second row, the corresponding ends of the cylinders of one row lying in a common plane and in the plane of the ends of the other row, a piston in each cylinder, a piston rod pivoted to each piston, a rocker for each pair of cylinders one of one row and one of the other row, fulcrumed on the frame and having three arms rigid with one another and including two right angles and one of the arms pivoted at one end to a pair of piston rods of one row and at the other end to a pair of piston rods of the other row, a connecting rod pivoted at one end to each third rocker arm, a shaft journaled in the frame between one row of cylinders and the plane equidistant from both rows of cylinders and having cranks each pivoted to the other end of a connecting rod.

4. The combination according to claim 3 and wherein each piston rod is connected to its piston and rocker arm by a wrist-pin-bearing assembly and wherein each third rocker arm is connected to its connecting rod by a wrist-pin-bearing assembly and the connecting rod is connected to the crank by a revolving-type of bearing.

5. In an internal combustion engine the combination comprising a frame, a pair of cylinders with their axes parallel to one another and each having an open and a closed end, a piston in each cylinder, a piston rod pivoted to each piston, a rocker fulcrumed on the frame and having three arms rigid with one another and including two right angles having one arm pivoted to one piston rod and the other arm pivoted to the other piston rod, the combined lengths of said two rocker arms equaling the distance between the cylinder axes, a single connecting rod pivoted at one end to the third rocker arm, and a shaft journaled in the frame between a cylinder and the plane equidistant from both cylinders having a crank pivoted to the other end of the connecting rod.

6. The combination according to claim 5 and wherein each piston rod has at either end a wrist-pin-bearing assembly and the third rocker arm is connected to the connecting rod by a wrist-pin-bearing assembly and the connecting rod is connected to the crank by a revolving-type bearing.

7. In a two cycle internal combustion engine the combination comprising a frame, two cylinders having their axes in parallel and both ends open and rigid with the frame, two pistons for each cylinder, a piston rod pivoted at one end to each piston, two rockers each fulcrumed at its midpoint on the frame and including three arms rigid with one another and including two right angles, two arms of a rocker being of equal lengths and each pivoted to the other end of a piston rod, the third arms of the rockers being offset, two connecting rods each pivoted at one end to the third arm of a rocker, and a shaft journaled in the frame between one cylinder and the plane equidistant from both cylinders and having a crank pivoted to the other ends of the connecting rods.

8. In a counter-balanced counter-action internal combustion engine the combination comprising a frame, a multiple of pairs of open-ended cylinders rigid with the frame, one row of pairs of cylinders being to one side of the frame and parallel to the other row, the cylinders of a pair being parallel to one another, pistons one in each end of a cylinder, connecting rods each having one end connected to a piston, rockers one for corresponding ends of two cylinder pairs, one pair in each row and each fulcrumed to the frame and having three arms including two right angles, one of the coplanar arms of each rocker connected to the other end of a connecting rod, second connecting rods one for each rocker and each having one end connected to the free end of a middle rocker arm, a crankshaft having one crank for each pair of rockers and connected to the other ends of a pair of second connecting rods and journaled in the frame between one cylinder row and the plane equidistant from both cylinder rows.

9. In a four cycle internal combustion engine the combination comprising a frame, a multiple of four cylinders open at their ends and rigid with the frame, an equal multiple of two of said cylinders being arranged with their axes parallel and constituting a row parallel to a like second row, the corresponding ends of the cylinders of one row lying in a common plane and in the plane of the ends of the second row of cylinders, a pair of pistons slidable in a cylinder, piston rods each pivoted to the outer end of a piston, a pair of rockers for each multiple of four cylinders fulcrumed to the frame, each rocker having three rigid arms including two right angles and having two arms each pivoted to the piston rods of a pair of cylinders of a row, a plurality of connecting rods each pivoted at one end to the third arm of a rocker, a pair of shafts journaled in the frame and having cranks each pivoted to the other end of a connecting rod, and gearing connecting the shafts.

10. The combination according to claim 9 and wherein the connecting rods of both shafts are connected by a common pin to the third rocker arm.

11. The combination according to claim 9 and wherein the connecting rods extend beyond their cylinder rows and the crankshafts are located exterior and parallel to the cylinder rows.

12. In a fluid-operated engine the combination comprising a frame, a multiple of two open-ended cylinders rigid with the frame in parallel and spaced relation, a pair of pistons for each cylinder, piston rods each pivoted at one end to a piston, a pair of rockers for each pair of cylinders and having three rigid arms, two arms of each rocker being each pivoted to the other end of a piston rod, a pair of crankshafts journaled in the frame, and connecting rods each pivoted at one end to a third rocker arm and at the other end to a crank.

13. The combination according to claim 12 and wherein the connecting rods of both shafts are connected to the rocker arm by the same pin.

14. The combination according to claim 12 and wherein the connecting rods extend beyond the cylinders and the shafts are journaled exterior to the cylinders.

ERNEST ZECHER.

REFERENCES CITED

The following references are of record in the file of this patent:

UNITED STATES PATENTS

| Number | Name | Date |
|--------|------|------|
| 1,168,116 | Scharf et al. | Jan. 11, 1916 |
| 1,419,159 | McKechnie | June 13, 1922 |
| 1,736,639 | Szydlowski | Nov. 19, 1929 |
| 2,295,879 | Tucker | Sept. 15, 1942 |